United States Patent Office 3,230,252
Patented Jan. 18, 1966

3,230,252
SYNTHESIS OF PHENYLCHLOROTETRA-
PHOSPHONITRILES
Irving I. Bezman, Pittsburgh, and Janet H. Smalley, Irwin,
Pa., assignors to Armstrong Cork Company, Lancaster,
Pa., a corporation of Pennsylvania
No Drawing. Filed Mar. 2, 1964, Ser. No. 348,758
2 Claims. (Cl. 260—543)

This application is a continuation-in-part of application Serial No. 165,937, filed January 12, 1962, now abandoned.

This invention relates to an improved method for the preparation of cyclic phenylchlorophosphonitriles of the formula [(C₆H₅)ClPN]ₙ and more particularly relates to a simple method for the production of the tetramer, [(C₆H₅)ClPN]₄, in high yield.

Although one report of the preparation of phenylchlorotetraphosphonitrile appears in the literature, no details concerning experimental procedure or yield are given; Shaw, R. A., and Stratton, C., Chem. & Ind. 52 (1959). This particular literature reference discloses that the authors prepared phenylchlorotetraphosphonitrile by repeating earlier work carried out by Bode and Bach, Ber. 75, 215 (1942). Bode and Bach had earlier reacted phenylphosphorus tetrachloride with ammonium chloride in refluxing tetrachloroethane and failed to obtain phenylchlorophosphonitriles. The authors also relate their synthesis to an analogous synthesis reported by Haber, Herring, and Lawton, J. Amer. Chem. Soc. 20, 2116 (1958). Haber et al. reacted diphenylphosphorus trichloride with ammonium chloride in s-tetrachloroethane at elevated temperatures to produce polymeric diphenylphosphonitriles but only in low (5–10%) yields.

E. J. Kohn, U. E. Hanninen, and R. B. Fox (Naval Research Laboratory Report C–3180, Sept. 23, 1947) also reacted phenylphosphorus tetrachloride with ammonium chloride in refluxing tetrachloroethane and after eight recrystallizations from hot ethylene glycol obtained a material whose analysis: P, 19.2; N, 8.8; Cl, 19.7 was close to that for C₆H₅ClPN; calculated: P, 19.7; N, 8.8; Cl, 22.5%, although no carbon and hydrogen values were given and the chlorine is 2.8% too low. The total yield of such crystalline product was only 10–15%, and no claim was made that this was the phenylchlorophosphonitrile tetramer.

We have made repeated efforts to synthesize

[(C₆H₅)ClPN]₄ by solution techniques as described above. We varied the solvent, reaction temperature, ratio of reactants, rates and order of addition, and also used gaseous ammonia in place of ammonium chloride. In no case were we able to isolate the desired tetramer.

We have now discovered that crystalline phosphonitrile polymers can be produced in better than 80% yield by heating a mixture of phenylphosphorus tetrachloride and ammonium chloride under anhydrous conditions in the absence of solvent. Furthermore, our process leads almost exclusively to the tetramer. A small portion of the crystalline products of our process is trimer but the trimer-tetramer ratio is only 1 to 40, approximately. The reaction as carried out is obviously a selective method for the preparation of the tetramer.

The product of this invention is of utility as a starting material in the synthesis of polymeric products. It contains four reactive groups (the chlorine atoms) and these are attached separately to each of the phosphorus atoms as shown:

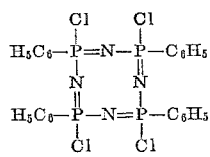

The chlorine atoms function as acid chlorides and are reactive with compounds containing active hydrogen atoms, such as amines and alcohols. Reaction with diamines and diols such as hexamethylenediamine and bisphenol A can lead to polymeric products incorporating the phosphonitrile ring structure in the chain.

Further, by controlled reactions two of the chlorine atoms may be replaced by a non-reactive group such as phenyl, C₆H₅, or secondary amino, NR₂, where R is an aliphatic or aromatic group, to give a compound which is difunctional with respect to the chlorines and which, on condensation with diols or diamines, gives linear polymers.

In accordance with this invention, phenylphosphorus tetrachloride and finely divided ammonium chloride are intimately mixed and heated at 140 to 155° C. to effect reaction. After approximately 40 hours, the evolution of HCl, the reaction byproduct, has essentially ceased. The crystalline phosphonitrilic compounds are obtained by simple extraction from the reaction mixture with a suitable organic solvent for the cyclic phosphonitriles, i.e., benzene, and the desired crystalline tetramer is easily and completely precipitated by concentration and cooling of the solution. Further concentration and cooling gives 1–2% of the trimer. Other suitable solvents useful in extracting the cyclic phosphonitriles are toluene, xylene, and tetrachloroethane.

The following example will serve to illustrate the invention more fully:

A large glass tube containing phenylphosphorus tetrachloride (108.2 g., 0.433 mole) is heated to a temperature slightly above the compound melting point, or to about 75 to 80° C. Sufficient pulverized and dried ammonium chloride (200 g.) is added to intimately mix with the liquid phosphorus halide and give a one inch dry cap. The resulting mixture is heated at 140 to 155° C. under nitrogen atmosphere. After approximately 40 hours, the evolution of HCl, the reaction byproduct, has essentially ceased. The resulting mixture of crystalline polymeric phenylchlorophosphonitriles is extracted from the excess ammonium chloride with benzene in a Soxhlet apparatus. Concentration of the resulting solution gives 54.5 g., an 80% yield based on the starting quantity of phenylphosphorus tetrachloride, of phenylchlorotetraphosphonitrile. One recrystallization from benzene yields 51.2 g. of product, M.P. 248–58° C. (Fisher-Johns block) which analyses as follows: C, 45.92; H, 3.45; N, 9.15; P, 19.68; Cl, 22.50; and mol. wt. 595 (B.P. elevation of chlorobenzene). The calculated values for [(C₆H₅)ClPN]₄ are: C, 4575; H, 3.20; N, 8.89; P, 19.67; Cl, 22.51; and mol. wt. 630. Further concentration of the benzene extract yields 1–2% of crude phenylchlorotriphosphonitrile.

A mixture of phenylchlorotetraphosphonitrile, prepared as described in the preceding example, and bisphenol A, in a 1:6 mole ratio, together with pyridine, a tertiary amine acid acceptor, were placed in a thick walled tube. The pyridine was present on an equimolar basis with respect to the bisphenol A. The tube was sealed and brought up to a temperature of 220 to 240° C. and kept in this temperature range for two to three hours. After cooling, the contents were extracted with acetone. The acetone solution was added to an excess of water and a thick oil or gum precipitated. Continued treatment with fresh batches of water removed the excess pyridine and its hydrochloride and converted the polymeric reaction product to a solid which was separated and dried.

A coating solution of the dried polymeric product was made by dissolving the product in methyl ethyl ketone at 35% solids content by weight. The solution was then used to coat highly polished ferro type plate, the coated plate then being put through a curing cycle involving an initial air dry for about one-half hour, followed by one-half hour at 110° C., 15 minutes at 270° C., and 10 minutes at 320 to 330° C. The cured coating was dark amber in color, adhered to the metal, and took a ⅜″ mandrel bend without cracking. It is useful as a protective coating for metal subjected to high temperature use.

We claim:
1. An improved method for the preparation of phenylchlorotetraphosphonitrile of the formula $[(C_6H_5)ClPN]_4$ consisting of intimately mixing phenylphosphorus tetrachloride and ammonium chloride, reacting said mixture under anhydrous conditions and in the absence of solvent at a temperature of from about 140 to 155° C. until evolution of the hydrochloric acid gas byproduct is substantially complete, and separating the phenylchlorotetraphosphonitrile from the reaction product.
2. The method in accordance with claim 1 in which said mixture is reacted under a nitrogen atmosphere.

References Cited by the Examiner
UNITED STATES PATENTS
3,138,638   6/1964   Bezman et al. _____ 260—551

OTHER REFERENCES
Bezman: J. Am. Chem. Soc., vol. 83, 1961, p. 2210.

LORRAINE A. WEINBERGER, *Primary Examiner.*